United States Patent [19]

Raz

[11] Patent Number: 4,666,004
[45] Date of Patent: May 19, 1987

[54] PALLET TRUCK WITH WEIGHING SCALE

[75] Inventor: Matti Raz, Los Angeles, Calif.

[73] Assignee: Pallet Truck Scale Corporation, Schiller Park, Ill.

[21] Appl. No.: 858,586

[22] Filed: May 1, 1986

[51] Int. Cl.$^4$ ............................................. G01G 19/08
[52] U.S. Cl. .................................... 177/139; 177/140
[58] Field of Search ........................ 177/139, 140, 146

[56] References Cited

U.S. PATENT DOCUMENTS

| | | |
|---|---|---|
| 2,638,336 | 5/1953 | Wetsel . |
| 2,757,923 | 8/1956 | Lefsheik . |
| 3,063,576 | 11/1962 | Hofmeister . |
| 3,431,992 | 3/1969 | Whitecar ............................ 177/140 |
| 3,910,363 | 10/1975 | Airesman ........................... 177/139 |
| 4,323,132 | 4/1982 | Bradley ............................. 177/139 |
| 4,420,053 | 12/1983 | Russo ................................ 177/139 |
| 4,421,186 | 12/1983 | Bradley ............................. 177/139 |
| 4,533,009 | 8/1985 | Evans ................................ 177/139 |

Primary Examiner—George H. Miller, Jr.
Attorney, Agent, or Firm—Esther O. Kegan; Milton S. Gerstein; Marvin N. Benn

[57] ABSTRACT

A pallet truck with a fork member movable in an up-and-down manner is provided with a plurality of load cells on the tines of the fork member for weighing loads carried by the pallet truck. Each load cell is mounted by a tine of the fork member, over which tine is floatingly mounted an elongated floating member extending substantially along the entire length of the respective tine member. Each floating member is supported by at least one ball bearing operatively associated with at least one load cells on the tine. A crosspiece is provided interconnecting the ends of the two floating members adjacent the main frame of the pallet truck, which crosspiece is fixedly secured to the ends of the floating members in order to provide stability and increased inertia to the entire floating mechanism. The ball bearings associated with the load cells are mounted adjacent a respective inner side-edge surface of the tine member, so that a wooden pallet with load may be more accurately weighed. Stop pins are also provided for preventing the accidental removal of the floating members and crosspiece.

11 Claims, 4 Drawing Figures

PALLET TRUCK WITH WEIGHING SCALE

BACKGROUND OF THE INVENTION

The invention relates to a pallet truck or pallet jack in which a fork-like member projecting from a main frame is used for raising and lowering a load positioned upon a pallet for subsequent relocation of the load. A hydraulic system is used for raising and lowering the fork member, under which are provided a plurality of rollers by which the pallet truck is moved. Typically, a linkage system links the tines of the fork member to the hydraulic system for the carrying out of the lowering and raising of the fork member.

It has been known to provide weighing load cells on the tines of the fork member in forklifts, and the like. Such prior art load cells, however, are not readily usable by the fork member of a pallet truck because the vertical lifting displacement of the fork member is within a very narrow range, compared with a forklift truck. In a conventional forklift, the fork member is raised and lowered over a considerable vertical distance, for not only lifting and moving a load, but also for stacking the load; whereas in a pallet truck, the fork member is lifted a very limited vertical distance in order to move the load from one location to another, without the possibility of stacking the loads. Thus, because the vertical distance moved by the fork member of a pallet truck is quite limited, prior art weighing load cells and devices used in conventional forklift trucks would not readily be adaptable to a pallet truck owing to the lack of space beneath the fork member, since mounted underneath thereof are the wheels or rollers. This is not the case in conventional forklifts where there are no wheels or wheel bases provided under the fork member.

U.S. Pat. No. 3,431,992 discloses a pallet lift having a hydraulic load cell on each tine thereof, for weighing a load emplaced upon the fork member of the device. However, the load cells are constituted by a reciprocating piston attached to a load-bearing rod for lifting the load, for the eventual weighing thereof by a hydraulic pressure system. The system of this patent is quite complicated, and inaccurate and can only indicate weight and not any other weighing function, and necessitates separate steps for weighing the load. Further, the initial lifting of the device is undertaken by the piston rods of the weighing system alone, without any support by the tines of the fork member. In addition, after weighing the load, these piston rods are retracted to allow the weight to be carried by the fork member, but in so doing, owing to the differences in timing by the retraction of the piston rods, the load and the pallet on the fork member may be misaligned and/or improperly oriented, especially in cases where the load being carried is lighter than normal. Further, this system could result in pallet-breakage in the cases where the load is not on the pallet cross-bars.

SUMMARY OF THE INVENTION

It is, therefore, the primary objective of the present invention to provide a pallet jack or lift incorporating therein a plurality of electronic-output load cells mounted in the fork of the pallet truck for weighing loads being carried and transported.

It is another objective of the present invention to provide a fork for the pallet truck incorporating therein electronic-output load cells for weighing the load, over which is mounted a pair of floating U-shaped members for overlapping and floating relationship to the pair of tines of the fork. These floating members are the weighing surfaces of the pallet truck. It is still another objective of the present invention to ensure that the floating members, floating above the load cells mounted within the tines of the fork member of the pallet truck, do not experience undue stress and strain during the carrying, weighing and transporting of a load.

Toward these and other ends, the pallet jack or truck of the present invention is provided with a plurality of load cells mounted to the tines of the fork member of the pallet truck. In the preferred embodiment, two such load cells are provided for each tine of the fork member. Also in the preferred embodiment, each load cell includes a ball bearing projecting above the upper surface of its respective tine, over which is floatingly mounted as elongated, U-shaped floating member having a base spaced above the upper surface of its respective tine and supported by at least one ball bearing. The floating member extends the entire length of the respective tine, and includes downwardly-projecting bearing surfaces for riding on, and cooperation with, the ball bearings of the load cells mounted within the tines. Each load cell and ball bearing associated therewith is mounted adjacent to the inner-edge surface of its respective tine. This ensures proper orientation and self-alignment of the floating members over the load cells, as well as accurate transformation of the forces applied to the load cells by the weight, eliminating parasitic side loads and moments, which might cause weighing errors.

BRIEF DESCRIPTION OF THE DRAWING

The invention will be more readily understood with reference to the accompanying drawing, wherein.

DETAILED DESCRIPTION OF THE DRAWING

Figure 1:
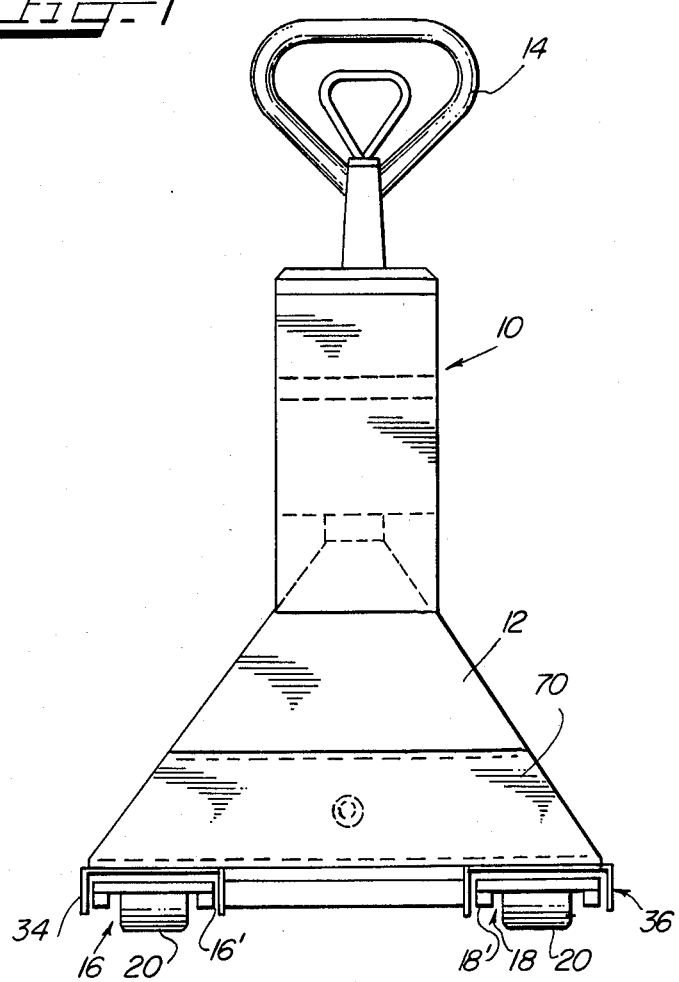
FIG. 1 is a front view of the improved pallet truck incorporating therein a weighing scale, according to the present invention.

Referring now to the drawings in greater detail, the improved pallet truck of the present invention is indicated generally by reference numeral 10. The pallet truck 10 includes conventional structure, such as main frame 12, handle 14, fork member having tines 16 and 18, and conventional hydraulic means (not shown) for lifting the tines 16 and 18 of the fork member above the ground, for the lifting and transporting of a load on a pallet. Wheels 20 are also provided for supporting the fork member on the ground, and associated therewith are linkages for causing the lifting and lowering of the tines 16 and 18, in response to the operation of the hydraulic means. In conventional use, the tines 16 and 18 are inserted into a pair of parallel grooves formed in a pallet upon which is placed a load to be lifted and transported to a remote site, which is achieved by the actuation of the hydraulic means for lifting the tines via the associated linkages thereof.

A pallet truck or pallet jack differs from a forklift in that the upward movement of the fork member is limited to a very small range; whereas in a forklift, the fork member is vertically adjustable to a wide range, so that a load and pallet may be moved from one site to another, and may be stacked one above the other. The pallet truck or jack is used uniquely for the simple transport of a load from one site to another, and not for stacking. Furthermore, besides the hydraulic means of the conventional pallet truck, operation of the device is carried out entirely by hand. That is, the powering means is provided by the operator by manually pushing the device to the desired location. In a forklift, the device itself is mechanically powered to move from one site to another.

Figure 4:
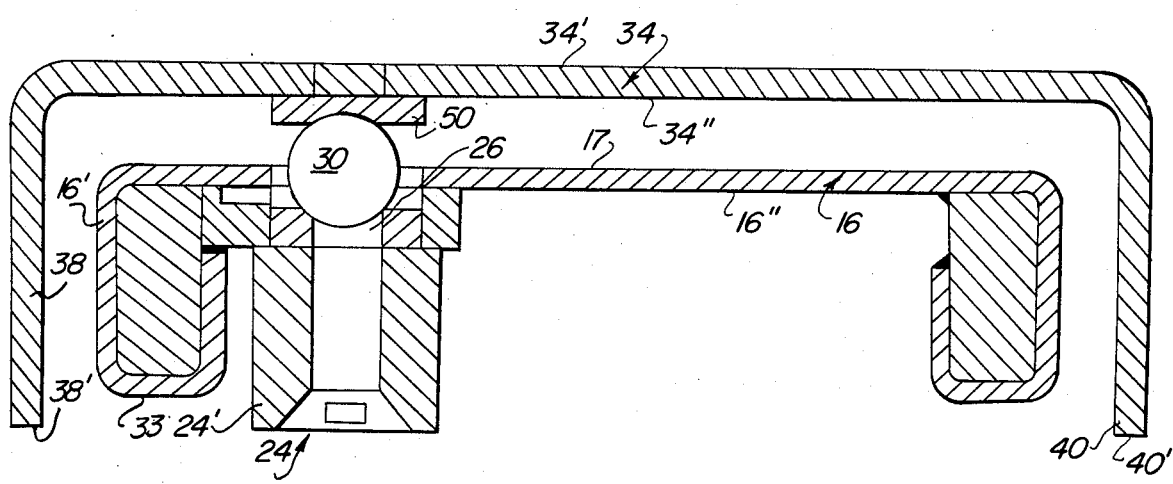
FIG. 4 is a cross-sectional view through one of the floating members of the improved pallet truck of FIG. 1, showing the floating arrangement of the member above a respective tine and load cell thereof.

According to the improved pallet truck 10 of the present invention, the tines 16 and 18 of the fork member are provided with electronic-output load cells for weighing a load on floating members 34, 36. In the preferred embodiment, each tine 16 and 18 is provided with a pair of load cells 22, 24, and 26, 28, respectively. As can best be seen in FIG. 4, each load cell is mounted to a respective tine adjacent the inner edge thereof (such as, for example, 16'), which inner edges face toward each other. This type of mounting provides the greatest possible accuracy in weighing a load. Since pallets are made of wood, they tend to bend or sag along the unsupported, middle or center portions thereof when loaded on the fork members of pallet trucks. Thus, if the load cells were to be mounted along the other, outer side edge surfaces of the tines, when a pallet is loaded on the floating members, portions of the pallet would contact the inner surfaces of the floating members, owing to the sagging of the pallet, thus causing an inaccurate reading of the weight. Each load cell includes an elongated, main body portion 24' extending downwardly from the undersurface of its respective tine member, and includes an upper, concave-shaped bearing surface 26 for rollingly mounting a ball bearing 30. The load cell proper is conventional and well-known in the art and may be that manufactured by TEDEA, Canoga Park, CA, Serial 3400. The ball bearing 30 has a portion that projects below the bottom surface 16" of its respective tine member, and has a portion projecting above the upper surface 17 of its respective tine member. Each floating member 34 and 36 is a generally U-shaped cross-sectional, elongated member, including a base portion 34' spaced above the upper surface 17 of a respective tine member, and a pair of downwardly-extending leg portions 38 and 40 that extend parallel to the side-edge surfaces of the respective tine member with which it is associated. These downwardly-extending leg portions 38 and 40 are spaced from the adjacent side-edge surfaces of the tine in overlapping relationship, and preferably have a length such that the tip portions 38' and 40' of each leg portion 38 and 40, respectively, extends beyond the lower, bottom surface 33 of the respective tine member, in order to provide for the greatest stability of the floating members by increasing the inertia thereof. Each floating member 34 and 36 is also provided with a pair of downwardly-extending, concave bearing-surface portions, indicated generally in FIG. 4 by reference numeral 50. Each downwardly-extending bearing-surface portion 50 coacts with a ball bearing 30 to provide the fulcrum points of each respective floating member 34 and 36. Thus, when a load is placed upon the fork member and, thus, on floating members 34 and 36, the weight thereof causes the floating members 34 and 36 to transmit the force from the weight via the ball bearings to the individual load cells, to thereby measure the weight of the load.

Figure 2:
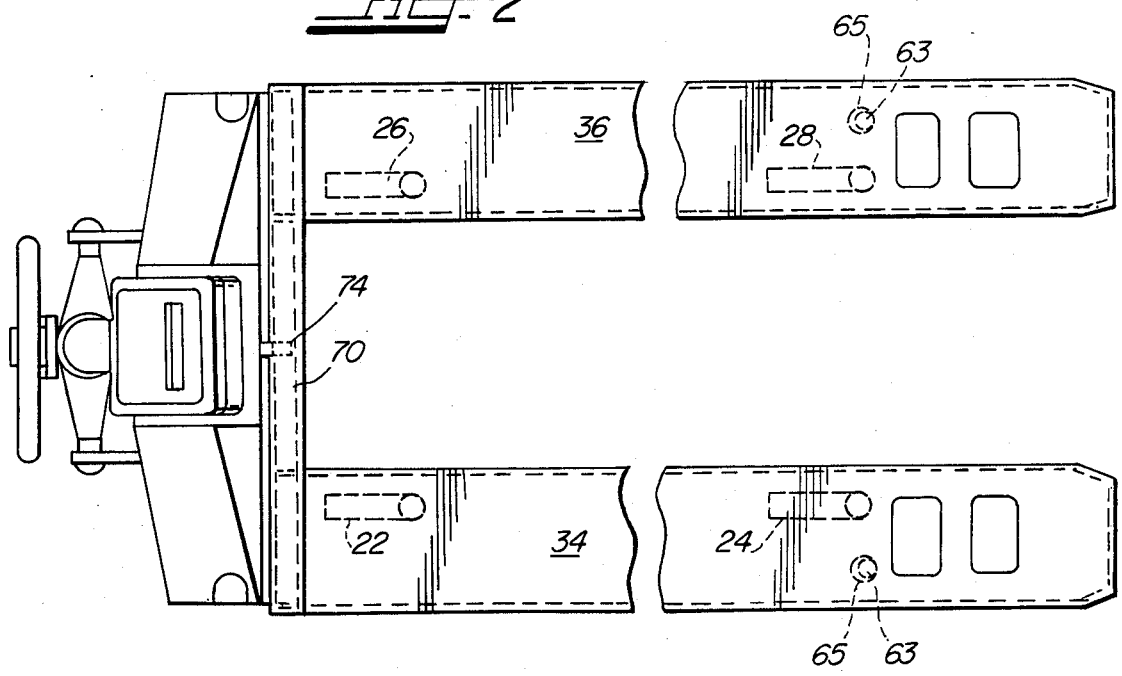
FIG. 2 is a top view of the improved pallet truck of FIG. 1.
Figure 3:
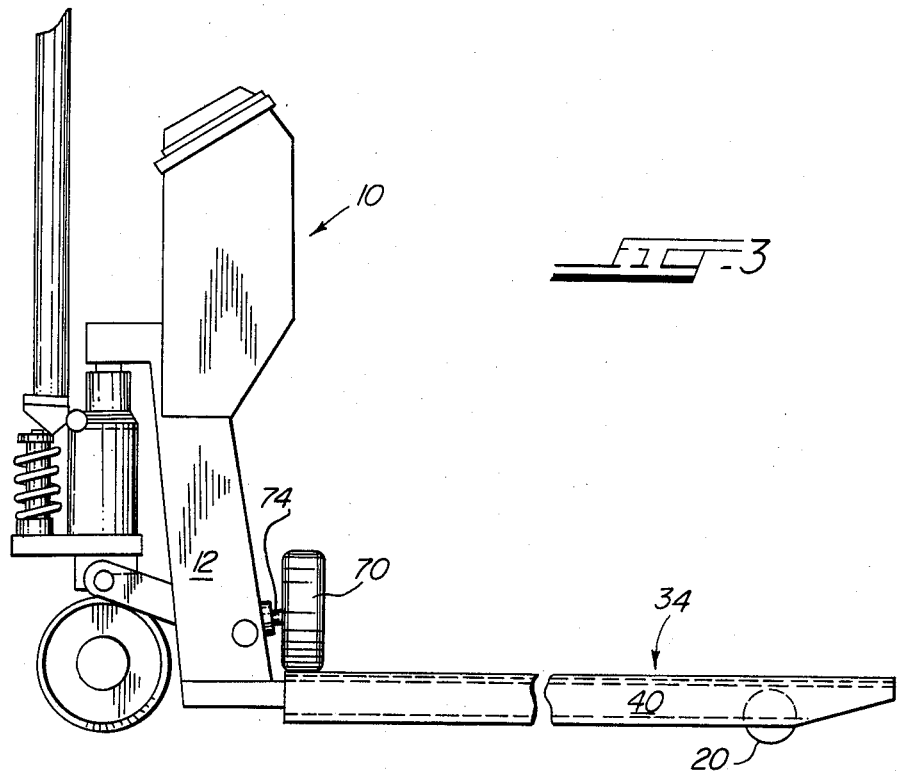
FIG. 3 is a side view of the improved pallet truck of FIG. 1.

In the preferred embodiment, each of the floating members 34 and 36 extends substantially along the entire length of each respective tine member 16 and 18, as clearly shown in FIG. 2. Also associated with each tine member 16 and 18 is a stop pin indicated generally by reference numeral 63 in FIG. 2. Each stop pin 63 preferably extends from the lower or bottom surface 34" of each floating member, for passage and reciprocation in an appropriately-formed through-hole of larger diameter, in a respective tine member thereunder. The lower end portion of each stop member is provided with an enlarged stop member 65, for limiting the upward movement of the respective floating member above the plane 17, to prevent the accidental removal of the floating members from connection with the tines and ball bearings. The stop pins 63 limit the movement of the floating members in the vertical direction by the enlarged members 65, while the larger-diameter through-holes limit movement in the horizontal directions.

In order to provide rigidity, the individual floating members 34 and 36 are connected by a crosspiece 70, which in the preferred embodiment is a hollow, substantially truncated, trapezoidal-shaped member. The crosspiece 70 spans the distance between the outer edges of the floating members 34 and 36, and is appropriately welded thereto, or integrally formed therewith, to provide a unitary, structurally-integral unit. Stop pin 74 projecting from the adjacent portion of the main frame is also provided, which stop pin 74 projects through a larger-diameter hole formed in the crosspiece 70, for preventing the accidental removal of the crosspiece in combination with the stop pins 63. The crosspiece 70 provides additional structural integrity to prevent undue stress and strain on the floating members 34 and 36, which are subject to enormous forces when very heavy loads are being carried and weighed. Instead of using a total of four load cells, it is also within the scope and purview of the invention to use three load cells in a triangular arrangement. In this case, the load cells 24 and 28 are the same and located as shown in FIG. 2. The load cells 22 and 26 are eliminated, and replaced by just one load cell positioned beneath the bottom surface of the crosspiece 70 approximately midway between the ends thereof. In FIG. 2, this third load cell, with associated ball bearing, would be approximately located in alignment with the pin 74 in the portion of the conventional fork member interconnecting the tines 16 and 18. The bottom surface of the crosspiece 70 is provided in this embodiment with a concave surface similar to concave surfaces 50 of the floating members 34, 36 shown in FIG. 4. This triangular positioning of the load cells offers greater stability when the load being weighed has its center of greater acting along a vertical axis lying within the bounds of the triangle formed by the three load cells.

While a specific embodiment of this invention has been shown and described, it is to be understood that numerous changes and modifications thereof may be made without departing from the scope and spirit of the invention, as set out in the appended claims.

I claim:

1. In a pallet jack comprising a main frame and a fork member attached to said main frame, said fork member having a pair of spaced-apart tines for entry into a pallet for the subsequent lifting and transporting thereof to a remote site, said main frame comprising means for raising and lowering said fork member for lifting the pallet and the load thereon, wherein the improvement comprises:

means mounted on said fork member for weighing the load on the pallet during lifting and carrying by said fork member;

said means for weighing comprising a first floating member having a U-shaped cross section, and a second floating member also having a U-shaped cross section, each of said first and second floating members being mounted over a respective one of said tines of said fork member, each of said first and second floating members extending substantially along the entire length of the respective tine over which it is positioned;

each of said first and second floating members having a base portion and a pair of leg portions extending from the edge surfaces of said base portion to form said U-shaped cross section, said base portion extending parallel to the upper surface of the respective tine over which it is positioned, and each of said pair of leg portions extending downwardly in parallel relationship and spaced from a respective one of the side surfaces of the respective tine with which it is associated;

a plurality of load cell means for mounting in said fork member, each said tine of said fork member mounting at least one of said load cell means which weight a load positioned on said first and second floating members by the contact of the undersurfaces of said base portions of said first and second floating members with said plurality of load cells means;

each of said tines of said fork member comprising at least one cavity for mounting therein a respective one of said plurality of load cell means, such that each said undersurface is in contact with the upper portion of at least one load cell means associated with the respective tine of said fork member; and said means for weighing further comprising a crosspiece having a first end fixedly connected to the end of said first floating member directly adjacent to said main frame, and a second end fixedly connected to the end of said second floating member directly adjacent to said main frame but spaced relative to said end of said first floating member.

2. The improvement according to claim 1, wherein each of said tines is provided with a pair of said load cell means spaced apart along the length of a respective one of said tines, one load cell means of each of said pair of load cell means being mounted directly adjacent to said crosspiece.

3. The improvement according to claim 2, wherein each of said load cell means is positioned directly adjacent to the inner-edge surface of a respective said tine, which inner-edge surface faces the other of said pair of tines.

4. The improvement according to claim 3, wherein said crosspiece connecting said ends of said first and second floating members directly adjacent to said main frame comprises a relatively thick, upstanding portion rising vertically upward from the top surfaces of said first and second floating members, said crosspiece providing substantial reinforcement to said first and second floating members to prevent excessive stress and attendant strain in said first and second floating members during the placement of the load thereon.

5. The improvement according to claim 1, wherein each of said load cell means comprises an upper ball bearing having a portion thereof extending above the plane of the upper surface of a respective one of said base portions, and a portion thereof extending below a respective said undersurface;

each of said first and second floating members also comprising at least one downwardly-extending bearing surface for coacting with at least a respective said ball bearing, each of said plurality of load cell means further comprising means for generating a single indicative of the weight of the load on said first and second floating members, which means for indicating a signal is generated in response to force acting on said first and second floating members.

6. The improvement according to claim 1, wherein each of said load cell means is positioned in a respective one of said tines directly adjacent to an edge surface of the respective tine, said edge surface facing the other of said pair of tines.

7. In a lifting mechanism having a fork member comprising a pair of parallel first and second tines, means for lifting said fork member for lifting and carrying a load from one site to another site, and weighing means operatively connected to and associated with said fork member, wherein the improvement comprises;

said weighing means comprising a first load cell mounted to said first tine, and a second load cell mounted to said second tine;

each of said first and second load cells comprising an upper ball bearing having a portion thereof extending below the top surface of its respective tine, and a portion thereof extending above;

a first floating member for positioning on said first load cell on said upper ball bearing thereof, and a second floating member for positioning on said second load cell on said upper ball bearing thereof;

each of said first and second load cells being mounted on its respective tine directly adjacent to the inner edge surface thereof, which inner edge surface faces the other of said first and second tines;

means for mounting each of said first and second load cells in a respective said tine; and a buttressing member having a first end fixedly connected to an end of one of said floating members, and a second end fixedly connected to an end of the other of said floating members; and means for each of said floating members and buttressing member for preventing the accidental removal thereof from said fork member.

8. The improvement according to claim 7, wherein said means for preventing comprises a plurality of pins, and each of said floating members and said buttressing member comprises a larger-diameter opening for the insertion of a respective said pin therein.

9. The improvement according to claim 7, wherein said weighing means further comprises a third load cell comprising an upper ball bearing mounted directly beneath the lower surface of said buttressing member approximately at the center thereof as taken in a direction from said first end of said buttressing member toward said second end thereof, said lower surface of said buttressing member being positioned on said upper ball bearing of said third load cell at the approximate said center thereof, said first, said second, and said third load cells forming a triangular arrangement.

10. A method of weighing a load on a pallet truck, which pallet truck comprises a main frame, a projecting fork member having a pair of tines upon which the load is placed for the lifting thereby and the transporting thereof, the method comprising:

mounting at least one weighing load cell to each of the tines of the fork member at a location of each respective tine adjacent the inner side-edge surface thereof, which inner side-edge surface faces the other of the respective tines;

floatingly mounting a pair of elongated load-absorbing members over the upper surfaces of the pair of tines of the fork member, said step of floatingly mounting also comprising providing ball bearings between a lower surface of each of the floating members and the upper surfaces of the load cells;

said step of floatingly mounting further comprising emplacing the ball bearings adjacent the inner-edge surfaces of the tine members, which inner-edge surfaces face each other;

connecting the ends of the floating members directly adjacent the main frame so as to fixedly tie the movements of the floating members together so as to add structural integrity to the floating mechanism; and placing a load to be weighed on both of the floating members floatingly mounted on the tines of the fork member.

11. The method according to claim 10, further comprising the step of mounting an additional load cell between the connected ends of the floating members directly beneath a crosspiece interconnecting the ends of the floating members formed by said step of connecting so that the undersurface of the crosspiece rests upon the additional load cell; said step of mounting the additional load cell comprising arranging all of the load cells in a triangular array.

* * * * *